United States Patent
Arora et al.

(10) Patent No.: US 10,920,581 B2
(45) Date of Patent: Feb. 16, 2021

(54) FLOW VELOCITY METER AND METHOD OF MEASURING FLOW VELOCITY OF A FLUID

(71) Applicant: SHELL OIL COMPANY, Houston, TX (US)

(72) Inventors: Dhruv Arora, Houston, TX (US); Matheus Norbertus Baaijens, Rijswijk (NL); Stephen Palmer Hirshblond, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 73 days.

(21) Appl. No.: 16/312,679

(22) PCT Filed: Jun. 30, 2017

(86) PCT No.: PCT/EP2017/066246
§ 371 (c)(1),
(2) Date: Dec. 21, 2018

(87) PCT Pub. No.: WO2018/002293
PCT Pub. Date: Jan. 4, 2018

(65) Prior Publication Data
US 2019/0226325 A1 Jul. 25, 2019

Related U.S. Application Data

(60) Provisional application No. 62/356,887, filed on Jun. 30, 2016.

(30) Foreign Application Priority Data

Jul. 7, 2016 (EP) .................................... 16178309

(51) Int. Cl.
*E21B 47/107* (2012.01)
*G01H 9/00* (2006.01)
(Continued)

(52) U.S. Cl.
CPC ............ *E21B 47/107* (2020.05); *E21B 47/01* (2013.01); *E21B 47/017* (2020.05);
(Continued)

(58) Field of Classification Search
CPC .... E21B 47/107; E21B 47/017; E21B 47/113; E21B 47/135; E21B 47/01; G01F 1/66;
(Continued)

(56) References Cited

U.S. PATENT DOCUMENTS

| 8,997,585 B2 | 4/2015 | Hayward |
| 2010/0207019 A1 | 8/2010 | Hartog et al. |

(Continued)

FOREIGN PATENT DOCUMENTS

| EP | 3073051 A1 | 9/2016 |
| WO | 0208791 A1 | 1/2002 |

(Continued)

OTHER PUBLICATIONS

International Search Report and Written Opinion received for PCT Patent Application No. PCT/EP2017/066246, dated Sep. 12, 2017, 12 pages.

(Continued)

*Primary Examiner* — Brad Harcourt (57) ABSTRACT

A flow velocity meter, for measuring flow velocity of a fluid, has a distributed acoustic sensor along aq longitudinal direction, which has a distributed sensing element. The distributed sensing element is acoustically coupled to a distributed fluid-contact surface via a distributed acoustic path extending between the distributed fluid-contact surface and the distributed sensing element. Moreover the distributed acoustic path is fully bypassing the fluid. At least a part of the fluid-contact surface is provided with a flow-disturbing surface texture having a surface relief with a predetermined pattern in said longitudinal direction. Acoustic (Continued)

flow noise, emitted as a result of the fluid flowing along and in contact with the flow-disturbing surface texture, is picked up by the distributed sensing element as a distributed acoustic signal.

32 Claims, 7 Drawing Sheets

(51) Int. Cl.
| | | |
|---|---|---|
| G01F 1/66 | (2006.01) | |
| E21B 47/01 | (2012.01) | |
| G01V 1/22 | (2006.01) | |
| E21B 47/017 | (2012.01) | |
| E21B 47/113 | (2012.01) | |
| E21B 47/135 | (2012.01) | |
| G01H 3/00 | (2006.01) | |

(52) U.S. Cl.
CPC .......... *E21B 47/113* (2020.05); *E21B 47/135* (2020.05); *G01F 1/66* (2013.01); *G01F 1/661* (2013.01); *G01H 9/004* (2013.01); *G01V 1/226* (2013.01); *G01H 3/00* (2013.01)

(58) Field of Classification Search
CPC ......... G01F 1/661; G01F 1/666; G01V 1/226; G01H 3/00; G01H 9/004
See application file for complete search history.

(56) References Cited

U.S. PATENT DOCUMENTS

| | | |
|---|---|---|
| 2012/0018149 A1 | 1/2012 | Fidan et al. |
| 2013/0092371 A1 | 4/2013 | Hartog et al. |
| 2014/0180592 A1 | 6/2014 | Ravi et al. |
| 2014/0202240 A1 | 7/2014 | Skinner et al. |
| 2014/0260588 A1* | 9/2014 | Jaaskelainen ......... E21B 47/107 73/152.32 |
| 2014/0338438 A1 | 11/2014 | Fripp et al. |
| 2016/0138386 A1 | 5/2016 | Stokely et al. |
| 2016/0290835 A1 | 10/2016 | Mccoy |
| 2017/0139071 A1* | 5/2017 | Stokely .................... G01V 1/40 |

FOREIGN PATENT DOCUMENTS

| | | |
|---|---|---|
| WO | 2013045941 A1 | 4/2013 |
| WO | 2014068334 A1 | 5/2014 |
| WO | 2015035060 A1 | 3/2015 |
| WO | 2015065869 A1 | 5/2015 |
| WO | 2016028289 A1 | 2/2016 |

OTHER PUBLICATIONS

Stokely et al., "SPE-179151-MS Acoustics-Based Flow Monitoring During Hydraulic Fracturing" SPE Hydraulic Fracturing Technology Conference, Feb. 9, 2016, pp. 1-24, XP055338190.

Horst et al., "Fibre Optic Sensing for Improved Wellbore Surveillance", International Petroleum Technology Conference 16873, Mar. 28, 2013, pp. 1-6, XP055199975.

Hosseini et al., "Estimating the Flow Velocity Using Flow Generated Sound", International Journal of Mechanical, Aerospace, Industrial, Mechatronic and Manufacturing Engineering, vol. 9, Issue No. 8, 2015, pp. 1445-1448.

\* cited by examiner

FLOW VELOCITY METER AND METHOD OF MEASURING FLOW VELOCITY OF A FLUID

CROSS REFERENCE TO RELATED APPLICATIONS

This is a national stage application of International Application No. PCT/EP2017/066246, filed 30 Jun. 2017, which claims priority of U.S. Provisional Application No. 62/356,887, filed 30 Jun. 2016, and of European application No. EP16178309.7, filed 7 Jul. 2016. The latter are incorporated herein by reference.

FIELD OF THE INVENTION

In one aspect, the present invention relates to a flow velocity meter, for measuring flow of a fluid. In another aspect, the present invention relates to a method of measuring flow velocity of a fluid. In yet another aspect, the present invention relates to a method of producing a fluid from a formation in the earth and in still another aspect the invention relates to a method of injecting a fluid into a formation in the earth.

BACKGROUND OF THE INVENTION

Measuring of flow profiles in subterranean wells forms a continuing challenge in the oil and gas producing industry. An opto-acoustic flow velocity meter for use in subterranean wells is described in International application WO 2016/028289. This opto-acoustic flow velocity meter employs acoustic emitters positioned at known locations, which produce acoustic energy as fluid flows through or across the emitters. The acoustic energy is detected with an optical distributed acoustic sensing (DAS) system. The emitters are made with cavities, similar to flutes and/or whistles.

US-2014/0338438-A1 discloses a method of verifying a substance interface location during a cementing operation, the method comprising: optically measuring vibrations caused by substances flowing across structures distributed along a wellbore, the vibrations being caused at each structure; and the vibrations changing at each structure as the interface displaces across the structure during the cementing operation. A method of determining a property of at least one substance flowed in a wellbore can include optically measuring vibrations caused by the substance flowing across structures distributed along a wellbore, the vibrations being caused at each structure, and the structures having different shapes, thereby causing the vibrations at the structures to be different from each other when the substance flows across the differently shaped structures.

US-2014/0338438-A1 refers to placement of structures. Herein, vortices will be shed in a periodic manner. According to the disclosure, a frequency of vortex shedding, f, is related to a Strouhal Number, S as follows: $f=S*U/D$. The frequency of vibrations detected by an optical waveguide will be directly dependent on the velocity U of the cement composition or substances.

SUMMARY OF THE INVENTION

In accordance with a first aspect of the present invention, there is provided a flow velocity meter for measuring flow of a fluid, comprising distributed fluid-contact surface and a distributed acoustic sensor along a longitudinal direction, which distributed acoustic sensor comprises a distributed sensing element that is acoustically coupled to the distributed fluid-contact surface via a distributed acoustic path that extends between the distributed fluid-contact surface and the distributed sensing element and fully bypasses the fluid, wherein at least a part of the fluid-contact surface is provided with a flow-disturbing surface texture having a surface relief with a pre-determined pattern in said longitudinal direction.

In accordance with a second aspect of the invention, there is provided a method of measuring flow of a fluid, comprising providing, in the fluid, a flow velocity meter as defined in the preceding paragraph, and allowing the fluid to flow along and in contact with at least the part of the fluid-contact surface that is provided with the flow-disturbing surface texture, thereby emitting acoustic flow noise which is picked up by the distributed sensing element as a distributed acoustic signal.

The flow velocity meter and/or the method of measuring flow of a fluid as defined in the preceding paragraphs, may be employed in methods of producing a fluid from a formation in the earth and/or methods of injecting a fluid into the formation in the earth.

A method of producing a fluid from a formation in the earth may comprise allowing the fluid from the formation is to enter into a wellbore at one or more locations, whereby measuring the flow velocity of the fluid flowing in the wellbore with the method of measuring flow of a fluid and/or using the flow velocity meter, as defined in the preceding paragraphs.

A method of injecting a fluid into a formation in the earth may comprise forcing the fluid to flow down a wellbore from the wellbore, at one or more locations, into a formation of the earth, whereby measuring the flow velocity of the fluid flowing down the wellbore with the method of measuring flow of a fluid and/or using the flow velocity meter, as defined in the preceding paragraphs.

BRIEF DESCRIPTION OF THE DRAWINGS

The invention will be further illustrated hereinafter by way of example only, and with reference to the non-limiting drawing in which.

For the purpose of this description, a single reference number will be assigned to a line as well as a stream carried in that line. Same reference numbers refer to similar components. The person skilled in the art will readily understand that, while the invention is illustrated making reference to one or more a specific combinations of features and measures, many of those features and measures are functionally independent from other features and measures such that they can be equally or similarly applied independently in other embodiments or combinations.

DETAILED DESCRIPTION

The flow velocity meter proposed herein is essentially a distributed flow velocity meter, for measuring distributed flow velocity of a fluid. The proposed flow velocity meter comprises a distributed acoustic sensor that is acoustically coupled to a distributed fluid-contact surface via a distributed acoustic path. The distributed acoustic sensor comprises a distributed sensing element, capable of picking up acoustic signals in an uninterrupted continuous length interval in a longitudinal direction. The distributed acoustic path extends between the distributed fluid-contact surface and the fiber optic waveguide to achieve a close acoustic coupling between the distributed fluid-contact surface and the distributed sensing element. Moreover, the distributed acoustic path may fully bypass the fluid that is subject to the measurement of its flow velocity. At least a part of the fluid-contact surface is provided with a flow-disturbing surface texture having a surface relief with a pre-determined pattern in said longitudinal direction.

Figure 1:
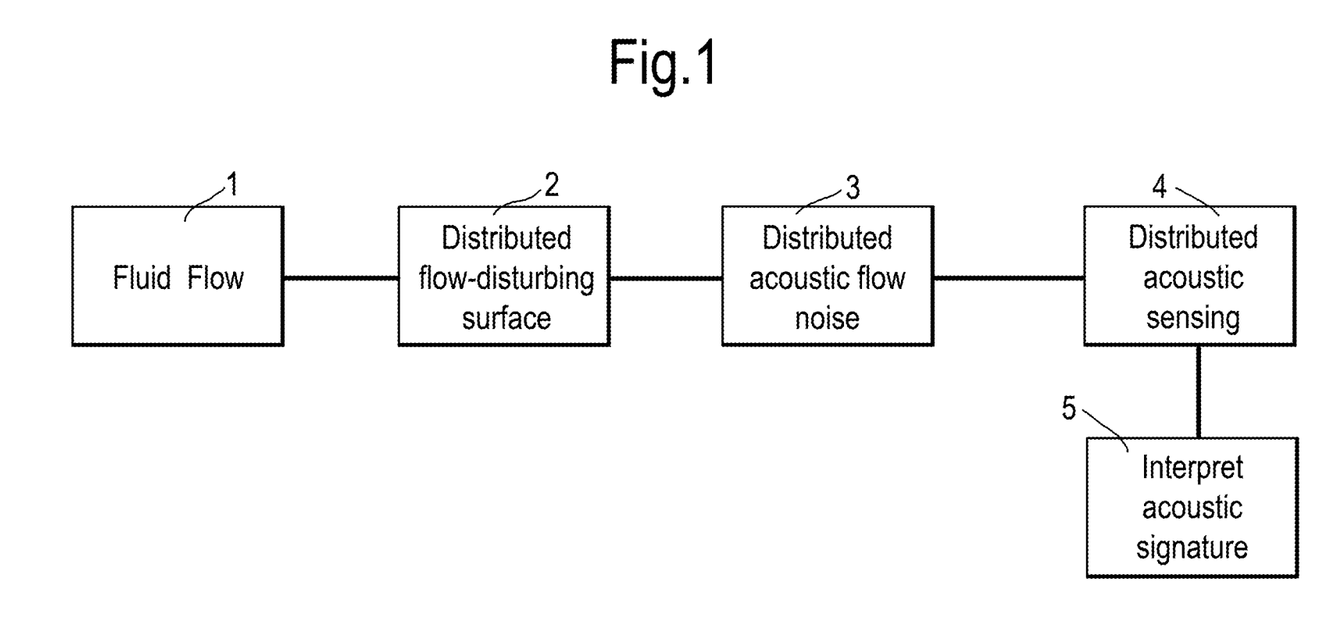
FIG. 1 schematically shows a flow diagram of a method of measuring flow of a fluid.

The underlying idea is schematically illustrated in FIG. 1. It has been found an acoustic flow noise is emitted when (1) the fluid flows along and in contact with (2) the flow-disturbing surface texture of a distributed flow-disturbing surface. This acoustic flow noise (3) is caused by the interaction of the fluid with the flow-disturbing surface texture. The emitted acoustic flow noise signal can be (4) picked up by the distributed acoustic sensor. The fluid flow is thus converted to sound, which has a specific acoustic signature that uniquely maps to flow velocity. The acoustic signature may be characterized by (a combination of) frequency spectrum and/or amplitude. The acoustic signature can be picked up by the distributed acoustic sensor, converted to a signal from the distributed sensing element which can be recorded.

An advantage of acoustically bypassing the fluid that is subject to the flow velocity measurement is that a more direct and efficient acoustic coupling to the distributed sensing element is achieved. This provides a more consistent acoustic signature. Moreover, the signal picked up by the distributed sensing element of the distributed acoustic sensor can be dominated by the generated acoustic flow noise compared to acoustic signals caused by other noise sources. The positioning of the distributed sensing element is preferably in close proximity with the flow-disturbing surface texture to enhance the relative dominance of the acoustic flow noise that is purposely generated on the flow-disturbing surface texture over other acoustic noise that is picked up by the distributed acoustic sensor.

The acoustic signature can be (5) interpreted to determine the flow of the fluid. To this end, the acoustic signature may be calibrated against flow velocity. Suitably, a parameter is attributed to the acoustic signature such that a unique link can be established between the value of the parameter and the flow velocity. The parameter may for example relate to the flow velocity via a pre-determined relationship (which may be an empirically determined function). An example wherein air-flow velocity is derived from flow-generated sound, using a wave power parameter, is discussed in an article by Saeed Hosseini and Ali Reza Tahavvor, published in Int. J. of Mechanical, Aerospace, Industrial, Mechantronic and Manufacturing Eng. Vol. 9(8), pp. 1445-1448 (2015). As the acoustic signatures corresponding to the noise generated by the pre-determined pattern of the flow-disturbing surface texture are known, they can be filtered from other acoustic signals that may be picked up by the distributed acoustic sensor.

One of the advantages is that the flow-disturbing surface texture forms a distributed source of sound when exposed to the fluid flowing along and in contact with at least the part of the fluid-contact surface that is provided with the flow-disturbing surface texture. The term "distributed" in the context of the present application has a meaning opposite to "discrete" or "localized". A distributed source of sound means that sound is generated along a continuous, uninterrupted stretch along the fluid-contact surface. In certain embodiments, the fluid flow velocity has at least a component in said longitudinal direction.

Likewise, the acoustic sensor is a distributed acoustic sensor, having a distributed sensing element, which means that the acoustic signals are sensed in a continuously distributed stretch along the length of the sensing element, as opposed to in discrete points.

Another advantage is that a flow-disturbing surface texture having a surface relief with a pre-determined pattern can be fairly easy to manufacture. For instance, it may be manufactured by knurling the surface.

Suitably, the distributed acoustic sensor comprises a cable in which the distributed sensing element is packaged in such a manner that the cable comprises an external surface facing away from the distributed sensing element. In such a case, the flow-disturbing surface texture can be provided on a portion of the external surface of the cable. Herewith a self-contained integrated flow velocity meter can be provided which has both the distributed sensing element and the distributed flow-disturbing surface combined. This can be deployed relatively easily, is versatile in its application, and moreover has a predictable acoustic coupling between the textured surface and the sensing element that picks up the generated sound. Alternatively, the flow-disturbing surface texture can be provided on a portion of a surface of a separate longitudinal body that is external to the distributed acoustic sensor. In that case, the distributed acoustic sensor, or at least the cable, can be mechanically adhered to the longitudinal body in touching contact with the longitudinal body via its external body surface. Sound generated at the external body surface is then acoustically coupled to the distributed sensing element through the touching contact between the cable and the longitudinal body.

It has also been conceived that the distributed sensing element is directly applied to the longitudinal body, without being packaged in a cable. This may involve employing for instance a protective tape which protects the distributed sensing element from direct exposure to the fluid.

Finally, while the flow-disturbing surface texture is effective at creating sound, it is an advantage that it does not have to form an additional significant flow restriction to generate the sound, which is beneficial for the continuity of the flow profile and pressure drop.

Figure 2:
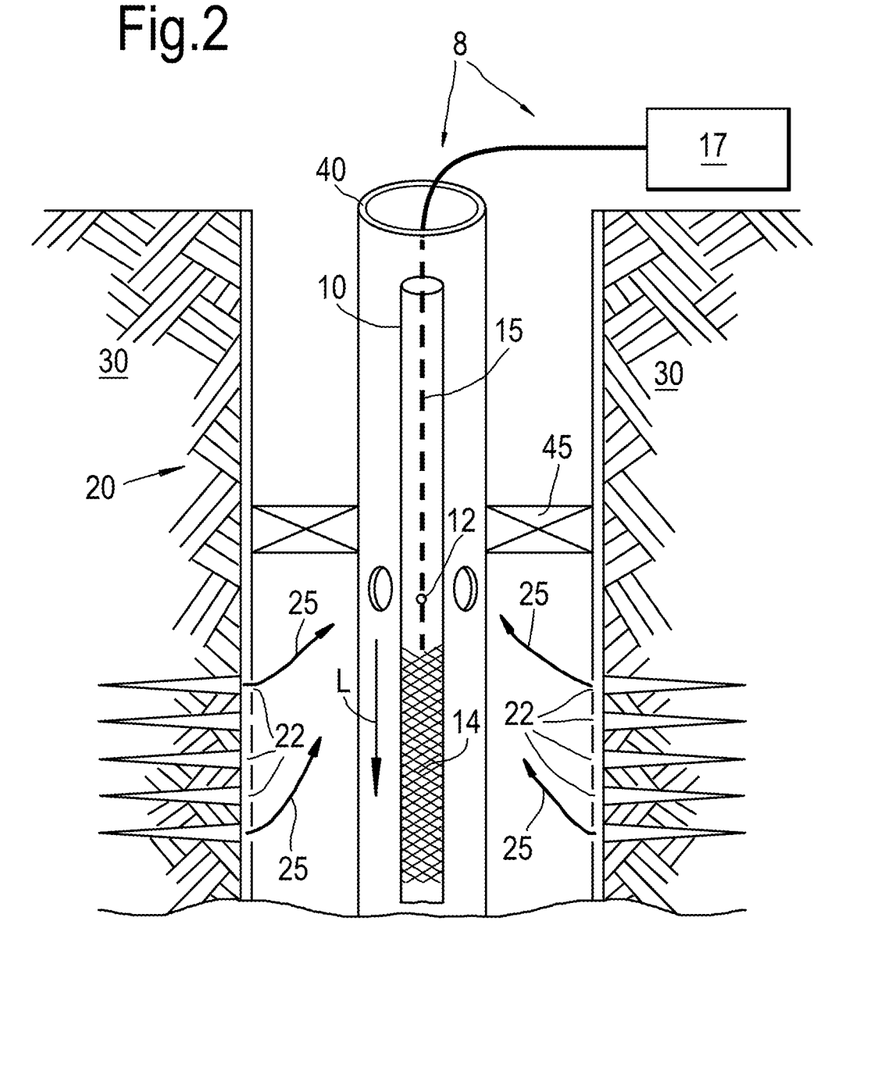
FIG. 2 schematically shows a perforated wellbore in the earth provided with an opto-acoustic distributed flow velocity meter according to one group of embodiments.

A practical implementation of the distributed flow velocity meter is illustrated in FIG. 2, wherein as an example both the distributed fluid-contact surface 12 and the distributed acoustic sensor 8 extend into wellbore 20 in the earth 30 along a longitudinal direction, which is schematically indicated at L. The longitudinal direction does not have to be straight. The distributed acoustic sensor 8 comprises a distributed sensing element 15. In this example, the distributed sensing element 15 is packaged in a cable 10.

The wellbore 20 may be cased, or open, or partially open. In the example of FIG. 2 the wellbore 20 is cased, and the casing 21 is perforated with perforations 22 to allow formation fluids to flow from the formation into the wellbore (indicated by arrows 25) or to allow injection fluids to pass from the wellbore into the formation (e.g. for well stimulating operations). It is useful to know the flow velocity as function of depth, or the flow velocity profile, especially in zones where the perforations 22 are present, in order to assess effectiveness of the perforations 22 in production of well fluids or in injecting injection fluids. Similarly, the flow profile may be of relevance there where in a wellbore multiple sidetrack wells and/or pinnate wells come together, causing confluence of fluids that field operators would like to monitor.

The wellbore 20 may further be provided with any combination of typical well equipment, including longitudinal bodies such as production and/or injection tubing 40, and/or production liner which is hung off inside the wellbore (not shown), and the wellbore 20 may be divided in zones using one or more packers 45. It should be noted, however, that example in FIG. 2 is very schematic to illustrate how the invention can be applied, and not intended to limit application of the invention to any specific wellbore design in any way.

The cable 10 may take any suitable form, preferably cylindrical, with any suitable cross sectional contour. Example contours include circular, oval, faceted, multilateral (such as rectangular or trapezoid), and concave and/or convex curved. Suitably the cable 10 is of a low-profile design to keep any protrusion from the surface on which it is mounted to a minimum. Reference is made to co-pending U.S. application Ser. No. 15/182,058 for specific examples of a suitable low-profile design.

In the group of embodiments illustrated with FIG. 2, the external surface of the cable, which faces away from the distributed sensing element 15, forms the fluid-contact surface 12 of which at least a part 16 is provided with a flow-disturbing surface texture 14. The flow-disturbing surface texture 14 preferably extends essentially uninterrupted for over a certain length interval in the longitudinal direction. When exposed to the flowing fluid 25, the part 16 of the fluid-contact surface 12 that is provided with the flow-disturbing surface texture 14 forms a distributed source of sound (acoustic flow noise).

The flow-disturbing surface texture 14 suitably has a surface relief with a pre-determined pattern in the longitudinal direction. As the pattern is pre-determined, it is expected that the flow-generated acoustic noise has an acoustic signature that can be uniquely mapped to the flow velocity in a given configuration.

The pattern suitably is repetitive, at least in the longitudinal direction. The repetitive pattern may be characterized with a periodicity, which is defined as the length in the longitudinal direction of the largest repetitive feature in the pattern. The length interval over which the repetitive pattern extends (without substantial interruption) is suitably at least four times more than the period associated with the pattern, at least in the longitudinal direction.

The distributed sensing element 15 is acoustically coupled to the distributed fluid-contact surface 12. To this end, a distributed acoustic path extends between the distributed fluid-contact surface and the distributed sensing element, which fully bypasses the fluid of which the flow velocity is to be determined. In embodiments were the distributed sensing element 15 is packaged in a cable 10, this means that the distributed sensing element 15 can be embedded in one or more materials, such as gel, which may be surrounded by one or more layers of other materials such as reinforcement layers, fluid tight layers, and layers offering protection from mechanical and chemical impact. The external surface of the cable 10 may be formed by a metal jacket.

The acoustic flow noise, generated by the interaction of the fluid with the flow-disturbing surface texture 14, traverses all of the layers to reach the distributed sensing element 15 and does not need to traverse through the fluid in order to reach the distributed sensing element 15.

Figure 3:
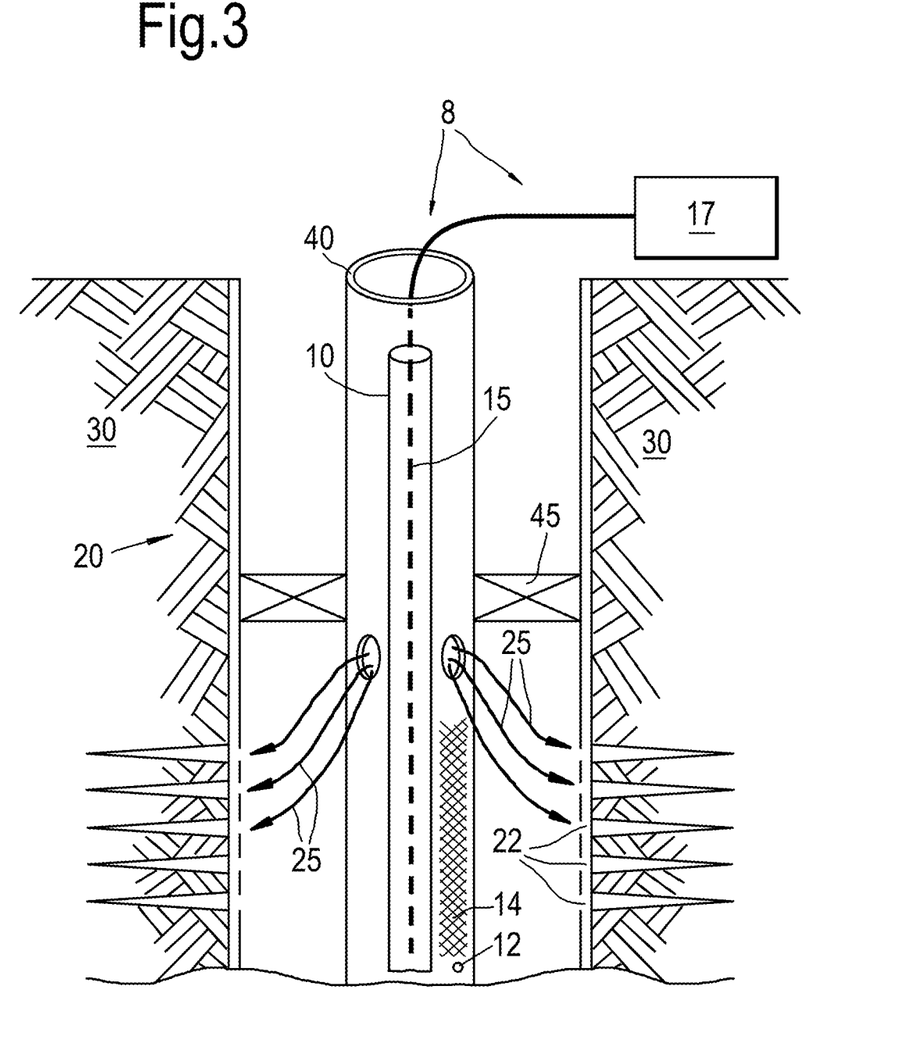
FIG. 3 schematically shows a perforated wellbore in the earth provided with an opto-acoustic distributed flow velocity meter according to another group of embodiments.

FIG. 3 schematically shows a group of embodiments wherein the cable 10 is mechanically adhered to the production and/or injection tubing 40, which forms a longitudinal body positioned in the wellbore 20 in longitudinal direction. In this case, the distributed fluid contact surface 12 is the body surface of the production and/or injection tubing 40. The cable is in distributed touching contact with the production and/or injection tubing 40 via the body surface. Flow-disturbing surface texture 14 provided on the body surface.

In the example for FIG. 3, the fluid 25 is depicted as an injection fluid which enters the zone below packer 45 through an injection sub represented as openings in the injection tubing 40. The acoustic flow noise, generated by the interaction of the fluid with the flow-disturbing surface texture 14, travels through the wall material of the production and/or injection tubing 40, and via the distributed contact between the cable 10 and the body surface into the cable 10, where the acoustic noise traverses all of the layers to reach the distributed sensing element 15. Also in this group of embodiments, the acoustic flow noise does not need to traverse through the fluid 25 in order to reach the distributed sensing element 15.

Important is that the fluid of which the flow velocity is to be determined is allowed to flow along and in contact with at least the part of the fluid-contact surface that is provided with the flow-disturbing surface texture, so that a distributed sound source is created. It will be understood that the proposed distributed flow velocity meter can be implemented in many other ways. For instance, the flow-disturbing surface texture 14 may be provided on the inside surface of the production and/or injection tubing 40 while the distributed acoustic sensor is configured on the outside surface of the production and/or injection tubing 40. Similarly, the distributed sensing element (regardless of whether it is packaged in a cable or not) may be configured on the inside surface of the longitudinal body such as the inside surface of the production and/or injection tubing 40.

The surface relief may be embossed directly into or onto the cable or longitudinal body to which the cable and/or the distributed sensing element is adhered to. Alternatively, the surface relief may be provided via an intermediate body such as bar, a rod, a strip, or a ring, that can be brought in contact with the production and/or injection tubing 40, with the cable 10, and/or with the distributed sensing element 15. These items may, for instance, be strapped, glued, cemented, or screwed to the longitudinal body.

In examples provided above, the distributed sensing element 15 is represented as a fiber optic waveguide, which can be used for subsurface distributed acoustic sensing. The fiber optic waveguide may be optically coupled to an optical interrogator 17. An optical probe signal can be transmitted from the optical interrogator 17 an emitted into the fiber optic waveguide. Along the entire length of the fiber optic waveguide, the optical probe signal is subject to backscattering (Rayleigh scattering) by random micro-heterogeneities and/or impurities that are naturally present in and inherently distributed throughout the fiber optic waveguide. Changes in the Rayleigh back-scattered pattern occur when distributed acoustic flow noise waves deform the fiber optic waveguide, and these are translated into the distributed acoustic signature of acoustic waves as they are picked up with the fiber optic waveguide. Part of the thus scattered probe signal can thus be used as optical return signal that is emitted from the fiber optic waveguide. The location of any deformation is determined from the known time of flight of the optical signal pulse that sensed it. The distributed signal from the fiber optic waveguide can be subdivided into acoustic channels. While DAS technology in particular, and fiber optic acoustic sensing in general, are currently perceived to be preferred technologies for distributed acoustic sensing, it should be stressed that the invention is not necessarily limited to these or any other specific technologies for distributed acoustic sensing.

Figure 4:
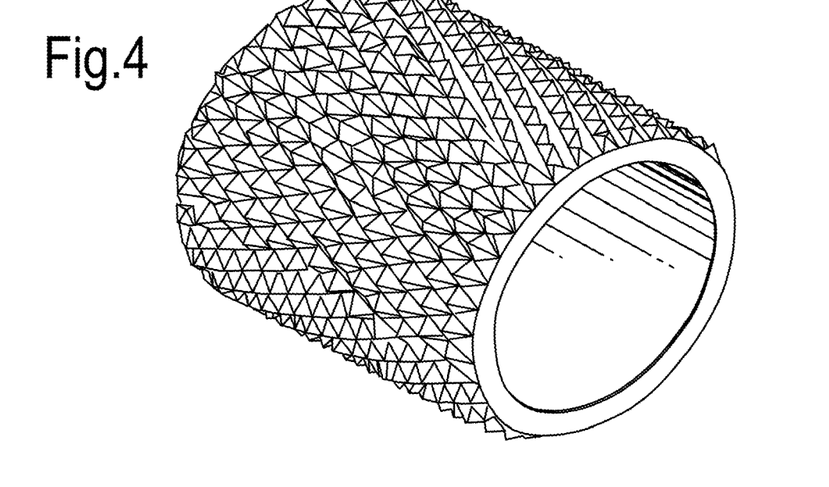
FIGS. 4-6 schematically show examples of pre-determined patterns of surface reliefs.
Figure 5:
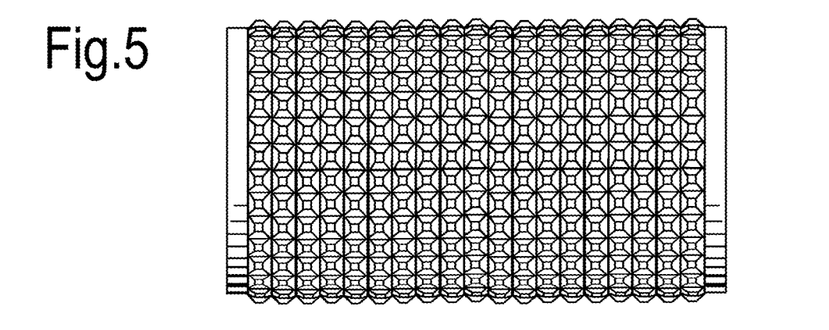
Figure 6:
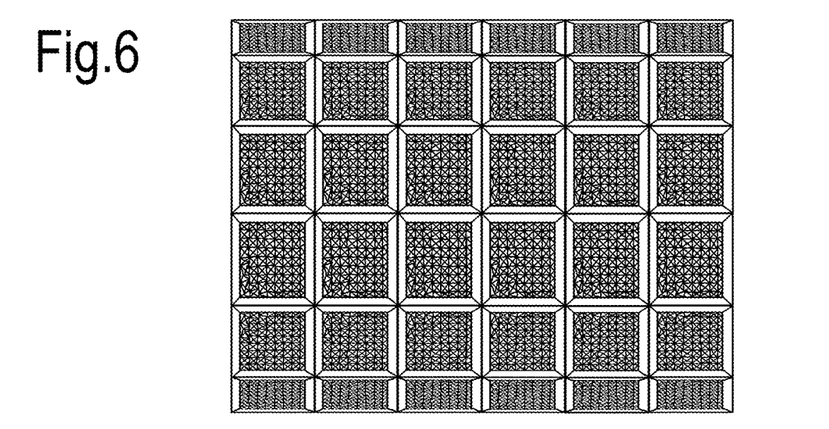

FIGS. 4-6 show examples of surface relief patterns that can be selected. FIG. 4 shows a pattern characterized by two sets of helical grooves on a hollow longitudinal body, one set of regularly interspaced helical grooves with positive parity (winding clockwise) and one set of regularly interspaced helical grooves with negative parity (winding counter clockwise). The interspacing in the two sets of helical grooves can be mutually the same or one set can have an interspacing that is different from the interspacing of the other set. FIG. 5 shows a pattern characterized by a set of longitudinal aligned interspaced straight grooves and a set of interspaced transverse grooves. Again, the interspacing in both sets can be identical or different from each other. FIG. 6 shows a pattern that consists of a combination of FIG. 5 and FIG. 6, whereby the interspacing in the sets of longitudinal/transverse grooves is larger than the interspacing in the sets of helical grooves. Many more variants can be selected, including more complex patters inspired on, for instance, tire treads.

The types of longitudinal bodies as are depicted in FIGS. 4-6 can be applied as the outer metal jacket of a cable, or they can be applied as a sleeve over a well tubular. The patterns may also be applied directly on sections of well tubulars. The patterns can be applied on convex (external) surfaces as shown in the Figures, and on concave (internal) surfaces of tubes or the like (not shown), depending on where the flow velocity is to be determined. The flow-disturbing surface texture may suitably be provided in the form of a knurled surface.

It will be apparent that, amongst other advantages than those already described above, the flow velocity meter and method enjoy great ease of manufacture and installation, and can be applied at relatively low cost. The flow velocity meter and/or the method of measuring flow of a fluid as described herein, may be employed in methods of producing a fluid from a formation in the earth and/or methods of injecting a fluid into the formation in the earth.

Figure 7:
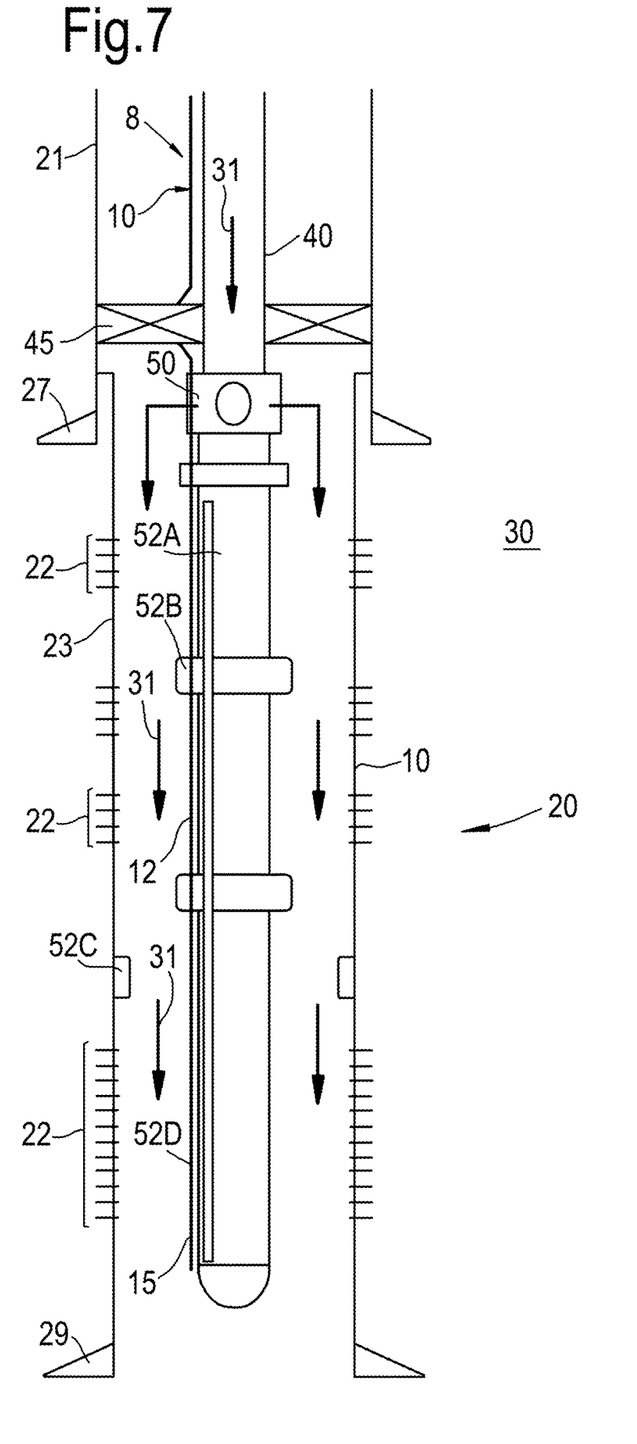
FIG. 7 shows a cross section of a wellbore, indicating optional locations for embodiments of the disclosure.

FIG. 7 shows other practical embodiments of the distributed flow velocity meter. Herein, the distributed acoustic sensor 8 comprises a distributed sensing element 15, optionally comprised in a cable 10.

The wellbore 20 may be cased, or open, or partially open. In the example of FIG. 7 the wellbore 20 is provided with casing 21 and liner 23. Tubing 40 is arranged within the casing and liner. The liner 23 is perforated with perforations 22 to allow formation fluids to flow into the wellbore or to allow injection fluids (indicated by arrows 31) to pass from the wellbore into the formation 30 (e.g. for well stimulating operations). Both casing 21 and liner 23 are provided with a cement shoe 27 and 29 respectively. Packer 45 may be arranged between casing 21 and tubing 40 to allow injection of fluids 31 via injection sub 50.

An external surface of the cable 10, which faces away from the distributed sensing element 15 (typically comprising one or more optical fibers), may form the fluid-contact surface 12. Flow-disturbing elements 52 according to the disclosure may be arranged at one or more of the locations indicated in FIG. 7. The elements may for instance be arranged on the tubing 40 (element 52A), on joints of the tubing (element 52B), on the inside surface of the liner 23 (element 52C), and/or on an outside surface of the cable 20 (element 52D).

The flow-disturbing elements 52 may include a surface texture (such as indicated by 14 in FIG. 2).

Figure 8:
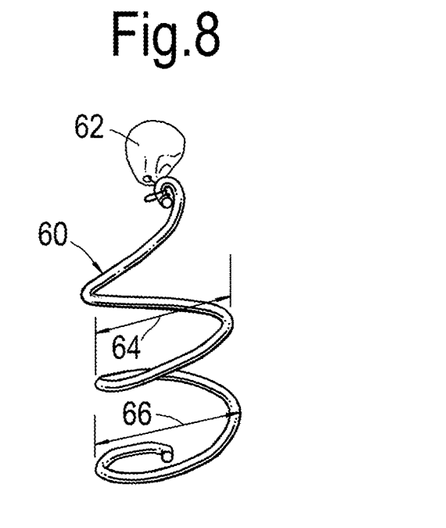
FIG. 8 shows an embodiment of an embodiment of a flow inducing body of the disclosure.

Alternatively, or in addition, the flow-disturbing elements 52 may comprise a mechanical element. FIG. 8 indicates a spring element, having an attachment 62 and windings having a certain diameter. The diameter of the windings may vary, for instance increase in a direction away from the attachment 62. Herein, diameter 66 at an end of the spring element may exceed the diameter 64 of a winding in the middle of the spring element 60. The spring element may hinge on the attachment, i.e. the attachment may allow the windings to pivot or hinge with respect to the attachment. The attachment can be fixed to another element within the wellbore (as indicated in, for instance, FIG. 7).

Concept of the method and system of the disclosure is directed to generate flow noise at or near the location of the fiber 15. The amplitude of the noise is proportional to a velocity of the fluid 25, 31 along the fiber 15.

Figure 9:
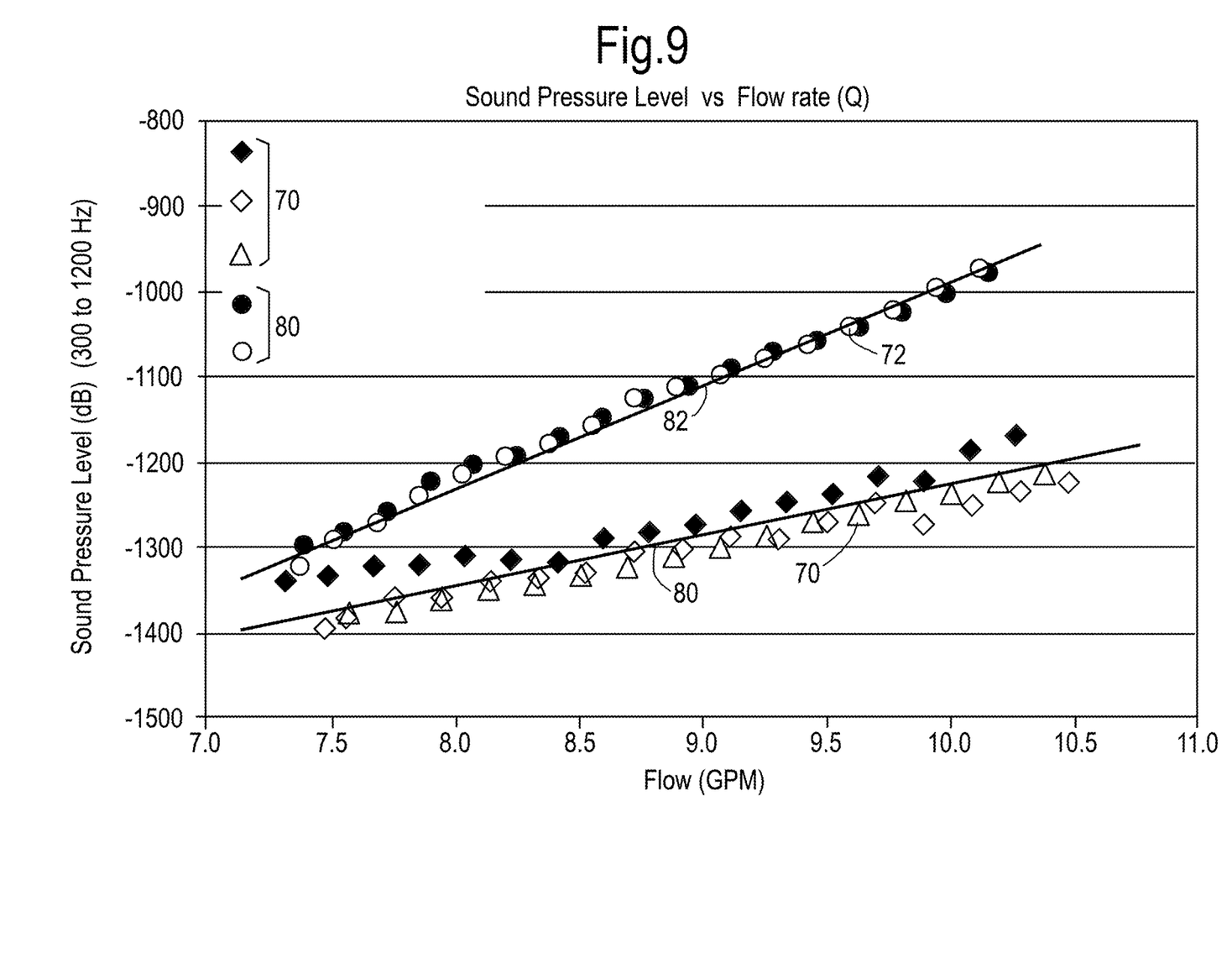
FIG. 9 shows an exemplary diagram indicating a relation between sound pressure level (y-axis) versus flow velocity (x-axis) for conventional wellbore systems and embodiments of the disclosure.

The diagram of FIG. 9 indicates the relation of sound pressure level (y-axis; in dB) versus fluid flow rate (x-axis). The sound pressure level may be measured within a frequency range, for instance between 300 to 1200 Hz. The diagram of FIG. 9 shows measurements 70, 72 and related trend lines 80, 82 relating to measurements without and with the flow-disturbing elements 52 respectively.

As indicated, the sound pressure level has a linear relation with respect to the fluid flow rate. At least within a certain bandwidth of fluid flow, the difference between the trend line 80 (relating to measurements without the flow-disturbing elements 52) and the trend line 82 (relating to measurements with the flow-disturbing elements 52) increases substantially linearly with increasing flow rate. This linear relation may be valid within, for instance, a bandwidth of fluid flow exceeding 7 GPM and/or below 10 or 11 GPM. Herein, GPM indicates US gallons per minute (1 US gallon per minute is about $6.31 \times 10^{-5}$ m$^3$/s). Basically, the sound pressure level is the amplitude of the noise. Thus, the amplitude relates directly to the flow rate.

Figure 10:
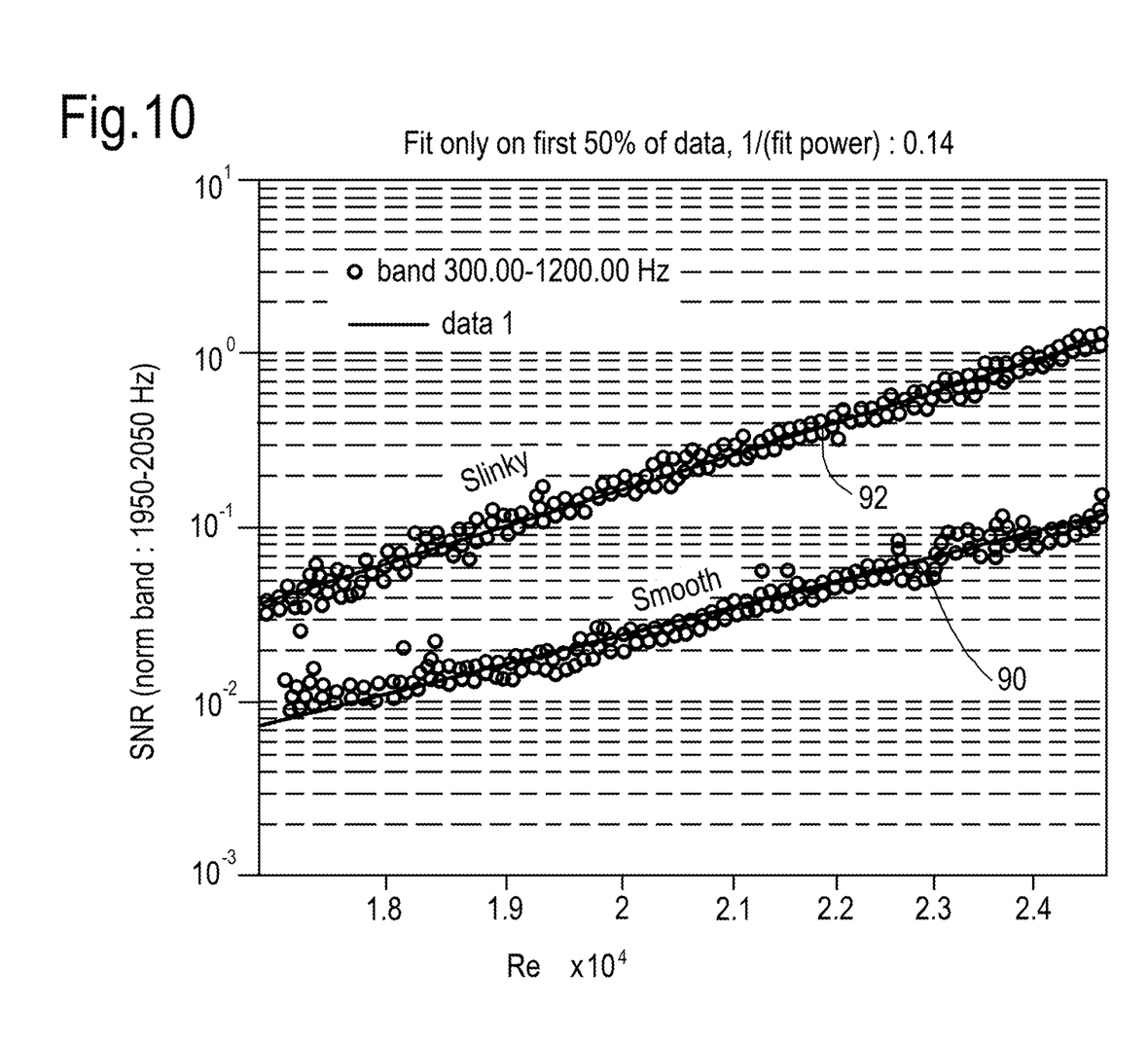
FIG. 10 shows an exemplary diagram indicating a relation between signal to noise ratio (SNR; y-axis) versus Reynolds number (Re; x-axis) for conventional wellbore systems and embodiments of the disclosure.

FIG. 10 shows an exemplary diagram indicating a relation between signal to noise ratio (SNR; logarithmical scale on the y-axis) versus Reynolds number (Re; linear scale, on the x-axis) for conventional wellbore systems and embodiments of the disclosure. Herein, trendline 90 relates to measurements without the flow-disturbing elements 52 and the trend line 92 relates to measurements with the flow-disturbing elements 52.

At least within a certain range of the Reynolds number, the difference between the trend line 90 (relating to measurements without the flow-disturbing elements 52) and the trend line 92 (relating to measurements with the flow-disturbing elements 52) increases substantially linearly with increasing Reynolds number. This linear relation may be valid within, for instance, in a range between 1.7 and 2.5 Re.

The slope of the trendlines 90, 92 is, for instance, between 0.1 and 0.15. The measurements with the flow disturbing elements induce about 10 times more noise.

A method of producing a fluid from a formation in the earth may comprise allowing the fluid from the formation is to enter into a wellbore at one or more locations, whereby measuring the flow velocity of the fluid flowing in the wellbore with the method of measuring flow of a fluid and/or using the flow velocity meter, as described herein.

A method of injecting a fluid into a formation in the earth may comprise forcing the fluid to flow down a wellbore from the wellbore, at one or more locations, into a formation of the earth, whereby measuring the flow velocity of the fluid flowing down the wellbore with the method of measuring flow of a fluid and/or using the flow velocity meter, as described herein.

The method and system of the present disclosure provide an alternative to listening to or interpreting noise made by perforations. The flow disturbing elements bring the source of the noise closer to the fiber 15, thus increasing accuracy of measurements.

The system and method have potential to greatly reduce the cost and complexity of fiber optic deployment. The method and system of the disclosure provide benefits, such as a relatively simple design; a controlled source of noise; and improved coupling of the noise to the fiber optic measurement device.

Options for application of the method and system of the disclosure include, for instance, single phase flow (flow of oil, water, or mixtures of oil and water). The method is suitable for injection conformance.

Normalization of measurements may be done per reference band, for instance about 2 kHz. Excitations, i.e. measured noise, may range up to frequencies in the order of 1500 Hz for smooth pipe, and up to 1700 Hz for pipe provided with flow disturbing elements. In practice, the flow disturbing elements 52 induce about 10 times more flow noise the flow without these elements. The sound intensity scales substantially linearly with the flow rate. The signal to noise ratio (SNR) scales substantially linearly with the Reynolds number, when the SNR is plotted on a logarithmical scale.

The system and method of the disclosure allow surfaces or patterns for flow disturbance that can be placed close to the fiber. This improves accuracy.

Prior art refers to frequency of vortex shedding as primary source of acoustic signal. The method and system of the disclosure relies on an increase in amplitude of the noise in relation to flow rate.

The person skilled in the art will understand that the present invention can be carried out in many various ways without departing from the scope of the appended claims, wherein various modifications are conceivable. Features of respective embodiments may for instance be combined.

That which is claimed is:

1. A flow velocity meter for measuring flow of a fluid, comprising:
    a distributed fluid-contact surface; and
    a distributed acoustic sensor along a longitudinal direction, which distributed acoustic sensor comprises a distributed sensing element that is acoustically coupled to the distributed fluid-contact surface via a distributed acoustic path, wherein the distributed acoustic path (1) extends between the distributed fluid-contact surface and the distributed sensing element, and (2) bypasses the fluid;
    wherein at least a part of the fluid-contact surface is provided with a flow-disturbing surface texture having a surface relief with a pre-determined pattern in said longitudinal direction, wherein said flow-disturbing surface texture is a knurled surface.

2. The flow velocity meter of claim 1, wherein said distributed sensing element is packaged in a cable comprising an external surface facing away from the distributed sensing element, and wherein the external surface comprises said knurled surface.

3. A flow velocity meter for measuring flow of a fluid, comprising:
    a distributed fluid-contact surface; and
    a distributed acoustic sensor along a longitudinal direction, which distributed acoustic sensor comprises a distributed sensing element that is acoustically coupled to the distributed fluid-contact surface via a distributed acoustic path, wherein the distributed acoustic path (1) extends between the distributed fluid-contact surface and the distributed sensing element, and (2) bypasses the fluid;
    wherein at least a part of the fluid-contact surface is provided with a flow-disturbing surface texture having a surface relief with a pre-determined pattern in said longitudinal direction,
    wherein said distributed sensing element is packaged in a cable comprising an external surface facing away from the distributed sensing element, whereby at least a portion of said external surface is the part of the distributed fluid-contact surface that is provided with the flow-disturbing surface texture.

4. The flow velocity meter of claim 3, wherein the part of the fluid-contact surface that is provided with said flow-disturbing surface texture forms a distributed source of sound when exposed to said fluid flowing along and in contact with at least the part of the fluid-contact surface that is provided with the flow-disturbing surface texture.

5. The flow velocity meter of claim 3, wherein said flow-disturbing surface texture is a knurled surface.

6. The flow velocity meter of claim 3, wherein the distributed sensing element is a fiber optic waveguide for guiding an optical probe signal along said longitudinal direction.

7. The flow velocity meter of claim 6, further comprising an optical interrogator that can be optically coupled to the fiber optic waveguide, for emitting the optical probe signal into the fiber optic waveguide and detecting an optical return signal emitted from the fiber optic waveguide.

8. The flow velocity meter of claim 3, wherein the distributed acoustic sensor extends into a pipe for measuring flow of the fluid through the pipe.

9. The flow velocity meter of claim 8, wherein the pipe is comprised in a wellbore in the earth.

10. A flow velocity meter for measuring flow of a fluid, comprising:
    a distributed fluid-contact surface; and
    a distributed acoustic sensor along a longitudinal direction, which distributed acoustic sensor comprises a distributed sensing element that is acoustically coupled to the distributed fluid-contact surface via a distributed acoustic path, wherein the distributed acoustic path (1) extends between the distributed fluid-contact surface and the distributed sensing element, and (2) bypasses the fluid;
    wherein at least a part of the fluid-contact surface is provided with a flow-disturbing surface texture having a surface relief with a pre-determined pattern in said longitudinal direction, wherein said distributed sensing element is packaged in a cable comprising an external surface facing away from the distributed sensing element, wherein the cable is mechanically adhered to a longitudinal body that extends in said longitudinal direction and comprises a body surface, such that the cable is in distributed touching contact with the longitudinal body via the body surface, wherein at least a portion of said body surface is the part of the distributed fluid-contact surface that is provided with the flow-disturbing surface texture.

11. A method of measuring flow velocity of a fluid, comprising the steps of:

providing a flow velocity meter comprising:
a distributed fluid-contact surface; and
a distributed acoustic sensor along a longitudinal direction, which distributed acoustic sensor comprises a distributed sensing element that is acoustically coupled to the distributed fluid-contact surface via a distributed acoustic path, that wherein the distributed acoustic path (1) extends between the distributed fluid-contact surface and the distributed sensing element, and (2) bypasses the fluid;
wherein at least a part of the fluid-contact surface is provided with a flow-disturbing surface texture having a surface relief with a pre-determined pattern in said longitudinal direction, wherein said flow-disturbing surface texture is a knurled surface;
allowing the fluid to flow along and in contact with at least the part of the fluid-contact surface that is provided with the flow-disturbing surface texture, thereby emitting acoustic flow noise; and
picking up the acoustic flow noise by the distributed sensing element as a distributed acoustic signal.

12. The method of claim 11, wherein the fluid flowing along and in contact with at least the part of the fluid-contact surface that is provided with the flow-disturbing surface texture generates a distributed sound source along the longitudinal direction.

13. The method of claim 11, further comprising recording a signal from the distributed sensing element.

14. The method of claim 11, wherein the distributed sensing element is a fiber optic waveguide for guiding an optical probe signal along said longitudinal direction.

15. The method of claim 14, further comprising emitting an optical probe signal into the fiber optic waveguide and detecting an optical return signal emitted from the fiber optic waveguide, thereby probing the distributed acoustic signal.

16. The method of claim 11, including the step of measuring noise up to frequencies in the order of 1500 Hz.

17. A method of measuring flow velocity of a fluid, comprising the steps of:

providing a flow velocity meter comprising:
a distributed fluid-contact surface; and
a distributed acoustic sensor along a longitudinal direction, which distributed acoustic sensor comprises a distributed sensing element that is acoustically coupled to the distributed fluid-contact surface via a distributed acoustic path, wherein the distributed acoustic path (1) extends between the distributed fluid-contact surface and the distributed sensing element, and (2) bypasses the fluid;
wherein at least a part of the fluid-contact surface is provided with a flow-disturbing surface texture having a surface relief with a pre-determined pattern in said longitudinal direction;
allowing the fluid to flow along and in contact with at least the part of the fluid-contact surface that is provided with the flow-disturbing surface texture, thereby emitting acoustic flow noise; and
picking up the acoustic flow noise by the distributed sensing element as a distributed acoustic signal, said method further including the steps of:
measuring a first amplitude of the noise at the part of the fluid-contact surface which is provided with the flow-disturbing surface texture;
measuring a second amplitude of the noise at another part of the fluid-contact surface which is not provided with a flow-disturbing surface texture; and
comparing the first amplitude to the second amplitude to determine the flow rate of the fluid.

18. The method of claim 17, wherein said flow-disturbing surface texture is a knurled surface.

19. The method of claim 17, wherein said distributed sensing element is packaged in a cable comprising an external surface facing away from the distributed sensing element, whereby at least a portion of said external surface is the part of the distributed fluid-contact surface that is provided with the flow-disturbing surface texture.

20. The method of claim 17, wherein said distributed sensing element is packaged in a cable comprising an external surface facing away from the distributed sensing element, wherein the cable is mechanically adhered to a longitudinal body that extends in said longitudinal direction and comprises a body surface, such that the cable is in distributed touching contact with the longitudinal body via the body surface, wherein at least a portion of said body surface is the part of the distributed fluid-contact surface that is provided with the flow-disturbing surface texture.

21. A method of measuring flow velocity of a fluid, comprising the steps of:

providing a flow velocity meter comprising:
a distributed fluid-contact surface; and
a distributed acoustic sensor along a longitudinal direction, which distributed acoustic sensor comprises a distributed sensing element that is acoustically coupled to the distributed fluid-contact surface via a distributed acoustic path, wherein the distributed acoustic path (1) extends between the distributed fluid-contact surface and the distributed sensing element, and (2) bypasses the fluid;
wherein at least a part of the fluid-contact surface is provided with a flow-disturbing surface texture having a surface relief with a pre-determined pattern in said longitudinal direction;
allowing the fluid to flow along and in contact with at least the part of the fluid-contact surface that is provided with the flow-disturbing surface texture, thereby emitting acoustic flow noise; and
picking up the acoustic flow noise by the distributed sensing element as a distributed acoustic signal,
said method further including the steps of:
measuring a first signal-to-noise ratio at the part of the fluid-contact surface which is provided with the flow-disturbing surface texture;
measuring a second signal to noise ratio at another part of the fluid-contact surface which is not provided with a flow-disturbing surface texture; and
comparing the first signal to noise ratio to the second signal to noise ratio to determine the flow rate of the fluid.

22. The method of claim 21, wherein said flow-disturbing surface texture is a knurled surface.

23. The method of claim 21, wherein said distributed sensing element is packaged in a cable comprising an external surface facing away from the distributed sensing element, whereby at least a portion of said external surface is the part of the distributed fluid-contact surface that is provided with the flow-disturbing surface texture.

24. The method of claim 21, wherein said distributed sensing element is packaged in a cable comprising an external surface facing away from the distributed sensing element, wherein the cable is mechanically adhered to a longitudinal body that extends in said longitudinal direction and comprises a body surface, such that the cable is in distributed touching contact with the longitudinal body via the body surface, wherein at least a portion of said body surface is the part of the distributed fluid-contact surface that is provided with the flow-disturbing surface texture.

25. A method comprising the steps of:
a. allowing a fluid to enter from a formation in the earth into a wellbore at one or more locations, or forcing a fluid to flow down the wellbore and from the wellbore, at one or more locations, into the formation of the earth; and
b. measuring the flow velocity of the fluid flowing through the wellbore with a method wherein:
b1. providing a flow velocity meter in the wellbore, said flow velocity meter comprising:
a distributed fluid-contact surface; and
a distributed acoustic sensor along a longitudinal direction, which distributed acoustic sensor comprises a distributed sensing element that is acoustically coupled to the distributed fluid-contact surface via a distributed acoustic path, wherein the distributed acoustic path (1) extends between the distributed fluid-contact surface and the distributed sensing element, and (2) bypasses the fluid;
wherein at least a part of the fluid-contact surface is provided with a flow-disturbing surface texture having a surface relief with a pre-determined pattern in said longitudinal direction, wherein said flow-disturbing surface texture is a knurled surface;
b2. allowing the fluid to flow along and in contact with at least the part of the fluid-contact surface that is provided with the flow-disturbing surface texture, thereby emitting acoustic flow noise; and
b3. picking up the acoustic flow noise by the distributed sensing element as a distributed acoustic signal.

26. A method comprising the steps of:
a. allowing a fluid to enter from a formation in the earth into a wellbore at one or more locations, or forcing the fluid to flow down the wellbore and from the wellbore, at one or more locations, into the formation of the earth; and
b. measuring the flow velocity of the fluid flowing through the wellbore using a flow velocity meter comprising:
a distributed fluid-contact surface; and
a distributed acoustic sensor along a longitudinal direction, which distributed acoustic sensor comprises a distributed sensing element that is acoustically coupled to the distributed fluid-contact surface via a distributed acoustic path, wherein the distributed acoustic path (1) extends between the distributed fluid-contact surface and the distributed sensing element, and (2) bypasses the fluid;
wherein at least a part of the fluid-contact surface is provided with a flow-disturbing surface texture having a surface relief with a pre-determined pattern in said longitudinal direction, wherein said flow-disturbing surface texture is a knurled surface.

27. A method of measuring flow velocity of a fluid, comprising the steps of:
providing a flow velocity meter comprising:
a distributed fluid-contact surface; and
a distributed acoustic sensor along a longitudinal direction, which distributed acoustic sensor comprises a distributed sensing element that is acoustically coupled to the distributed fluid-contact surface via a distributed acoustic path, wherein the distributed acoustic path (1) extends between the distributed fluid-contact surface and the distributed sensing element, and (2) bypasses the fluid;
wherein at least a part of the fluid-contact surface is provided with a flow-disturbing surface texture having a surface relief with a pre-determined pattern in said longitudinal direction,
wherein said distributed sensing element is packaged in a cable comprising an external surface facing away from the distributed sensing element, whereby at least a portion of said external surface is the part of the distributed fluid-contact surface that is provided with the flow-disturbing surface texture;
allowing the fluid to flow along and in contact with at least the part of the fluid-contact surface that is provided with the flow-disturbing surface texture, thereby emitting acoustic flow noise; and
picking up the acoustic flow noise by the distributed sensing element as a distributed acoustic signal.

28. A method of measuring flow velocity of a fluid, comprising the steps of:
providing a flow velocity meter comprising:
a distributed fluid-contact surface; and
a distributed acoustic sensor along a longitudinal direction, which distributed acoustic sensor comprises a distributed sensing element that is acoustically coupled to the distributed fluid-contact surface via a distributed acoustic path, wherein the distributed acoustic path (1) extends between the distributed fluid-contact surface and the distributed sensing element, and (2) bypasses the fluid;
wherein at least a part of the fluid-contact surface is provided with a flow-disturbing surface texture having a surface relief with a pre-determined pattern in said longitudinal direction,
wherein said distributed sensing element is packaged in a cable comprising an external surface facing away from the distributed sensing element, wherein the cable is mechanically adhered to a longitudinal body that extends in said longitudinal direction and comprises a body surface, such that the cable is in distributed touching contact with the longitudinal body via the body surface, wherein at least a portion of said body surface is the part of the distributed fluid-contact surface that is provided with the flow-disturbing surface texture;
allowing the fluid to flow along and in contact with at least the part of the fluid-contact surface that is provided with the flow-disturbing surface texture, thereby emitting acoustic flow noise; and
picking up the acoustic flow noise by the distributed sensing element as a distributed acoustic signal.

29. A method comprising the steps of:
a. allowing a fluid to enter from a formation in the earth into a wellbore at one or more locations, or forcing a fluid to flow down the wellbore and from the wellbore, at one or more locations, into the formation of the earth; and b. measuring the flow velocity of the fluid flowing through the wellbore with a method wherein:

b1. providing a flow velocity meter in the wellbore, said flow velocity meter comprising:

a distributed fluid-contact surface; and a distributed acoustic sensor along a longitudinal direction, which distributed acoustic sensor comprises a distributed sensing element that is acoustically coupled to the distributed fluid-contact surface via a distributed acoustic path, wherein the distributed acoustic path (1) extends between the distributed fluid-contact surface and the distributed sensing element, and (2) bypasses the fluid;

wherein at least a part of the fluid-contact surface is provided with a flow-disturbing surface texture having a surface relief with a pre-determined pattern in said longitudinal direction, wherein said distributed sensing element is packaged in a cable comprising an external surface facing away from the distributed sensing element, whereby at least a portion of said external surface is the part of the distributed fluid-contact surface that is provided with the flow-disturbing surface texture;

b2. allowing the fluid to flow along and in contact with at least the part of the fluid-contact surface that is provided with the flow-disturbing surface texture, thereby emitting acoustic flow noise; and b3. picking up the acoustic flow noise by the distributed sensing element as a distributed acoustic signal.

30. A method comprising the steps of:

a. allowing a fluid to enter from a formation in the earth into a wellbore at one or more locations, or forcing a fluid to flow down the wellbore and from the wellbore, at one or more locations, into the formation of the earth; and b. measuring the flow velocity of the fluid flowing through the wellbore with a method wherein:

b1. providing a flow velocity meter in the wellbore, said flow velocity meter comprising:

a distributed fluid-contact surface; and a distributed acoustic sensor along a longitudinal direction, which distributed acoustic sensor comprises a distributed sensing element that is acoustically coupled to the distributed fluid-contact surface via a distributed acoustic path, wherein the distributed acoustic path (1) extends between the distributed fluid-contact surface and the distributed sensing element, and (2) bypasses the fluid;

wherein at least a part of the fluid-contact surface is provided with a flow-disturbing surface texture having a surface relief with a pre-determined pattern in said longitudinal direction, wherein said distributed sensing element is packaged in a cable comprising an external surface facing away from the distributed sensing element, wherein the cable is mechanically adhered to a longitudinal body that extends in said longitudinal direction and comprises a body surface, such that the cable is in distributed touching contact with the longitudinal body via the body surface, wherein at least a portion of said body surface is the part of the distributed fluid-contact surface that is provided with the flow-disturbing surface texture;

b2. allowing the fluid to flow along and in contact with at least the part of the fluid-contact surface that is provided with the flow-disturbing surface texture, thereby emitting acoustic flow noise; and b3. picking up the acoustic flow noise by the distributed sensing element as a distributed acoustic signal.

31. A method comprising the steps of:

a. allowing a fluid to enter from a formation in the earth into a wellbore at one or more locations, or forcing the fluid to flow down the wellbore and from the wellbore, at one or more locations, into the formation of the earth; and b. measuring the flow velocity of the fluid flowing through the wellbore using a flow velocity meter comprising:

a distributed fluid-contact surface; and a distributed acoustic sensor along a longitudinal direction, which distributed acoustic sensor comprises a distributed sensing element that is acoustically coupled to the distributed fluid-contact surface via a distributed acoustic path, wherein the distributed acoustic path (1) extends between the distributed fluid-contact surface and the distributed sensing element, and (2) bypasses the fluid;

wherein at least a part of the fluid-contact surface is provided with a flow-disturbing surface texture having a surface relief with a pre-determined pattern in said longitudinal direction, wherein said distributed sensing element is packaged in a cable comprising an external surface facing away from the distributed sensing element, whereby at least a portion of said external surface is the part of the distributed fluid-contact surface that is provided with the flow-disturbing surface texture.

32. A method comprising the steps of:

a. allowing a fluid to enter from a formation in the earth into a wellbore at one or more locations, or forcing the fluid to flow down the wellbore and from the wellbore, at one or more locations, into the formation of the earth; and b. measuring the flow velocity of the fluid flowing through the wellbore using a flow velocity meter comprising:

a distributed fluid-contact surface; and a distributed acoustic sensor along a longitudinal direction, which distributed acoustic sensor comprises a distributed sensing element that is acoustically coupled to the distributed fluid-contact surface via a distributed acoustic path, wherein the distributed acoustic path (1) extends between the distributed fluid-contact surface and the distributed sensing element, and (2) bypasses the fluid;

wherein at least a part of the fluid-contact surface is provided with a flow-disturbing surface texture having a surface relief with a pre-determined pattern in said longitudinal direction, wherein said distributed sensing element is packaged in a cable comprising an external surface facing away from the distributed sensing element, wherein the cable is mechanically adhered to a longitudinal body that extends in said longitudinal direction and comprises a body surface, such that the cable is in distributed touching contact with the longitudinal body via the body surface, wherein at least a portion of said body surface is the part of the distributed fluid-contact surface that is provided with the flow-disturbing surface texture.

\* \* \* \* \*